United States Patent [19]

Ledoux et al.

[11] Patent Number: 5,117,491

[45] Date of Patent: May 26, 1992

[54] RING REDUCTION LOGIC USING PARALLEL DETERMINATION OF RING NUMBERS IN A PLURALITY OF FUNCTIONAL UNITS AND FORCED RING NUMBERS BY INSTRUCTION DECODING

[75] Inventors: Robert V. Ledoux, Litchfield; Richard P. Kelly, Nashua, both of N.H.; Forrest M. Phillips, North Chelmsford, Mass.

[73] Assignee: Bull HN Information Systems Inc., Billerica, Mass.

[21] Appl. No.: 332,258

[22] Filed: Mar. 31, 1989

[51] Int. Cl.[5] .................. G06F 9/06; G06F 12/00
[52] U.S. Cl. ................ 395/375; 364/DIG. 1;
364/231.8; 364/243.42; 364/246; 364/247;
364/259.2; 364/259.9; 364/262.8; 364/927.82;
364/933; 364/942.8; 364/947.2; 364/948.34
[58] Field of Search ..................... 364/200, 900

[56] References Cited

U.S. PATENT DOCUMENTS

| | | | |
|---|---|---|---|
| 3,916,385 | 10/1975 | Parmar et al. | 364/200 |
| 4,177,510 | 12/1979 | Appell et al. | 364/200 |
| 4,297,743 | 10/1981 | Appell et al. | 364/200 |
| 4,409,655 | 10/1983 | Wallach et al. | 364/200 |
| 4,703,417 | 10/1987 | Morganti et al. | 364/200 |
| 4,787,031 | 11/1988 | Karger et al. | 364/200 |
| 4,858,117 | 8/1989 | DiChiara et al. | 364/200 |
| 4,866,599 | 9/1989 | Morganti et al. | 364/200 |
| 4,980,819 | 12/1990 | Cushing et al. | 364/200 |

*Primary Examiner*—Thomas C. Lee
*Assistant Examiner*—Krisna Lim
*Attorney, Agent, or Firm*—George Grayson; John S. Solakian; Lewis P. Elbinger

[57] ABSTRACT

During the execution of an instruction by an execution unit, the instruction is stored in an instruction register, the operand including its ring number is stored in a data register and the ring number developed by the Virtual Memory Management Unit is stored in a ring effective register. The instruction addresses a control store which stores a firmware word in a control store register. A firmware field is decoded to generate a plurality of ring control signals. The ring numbers from the data and ring effective registers are compared and an effective ring number is generated. Depending on the states of the secure process signal, the ring control signals and the relative value of the ring numbers, the effective ring number is binary 00 or the larger ring number.

8 Claims, 5 Drawing Sheets

RING REDUCTION LOGIC USING PARALLEL DETERMINATION OF RING NUMBERS IN A PLURALITY OF FUNCTIONAL UNITS AND FORCED RING NUMBERS BY INSTRUCTION DECODING

RELATED APPLICATIONS

The following U.S. Patent applications are related applications to the instant application.
1. The patent application of Richard P. Kelly and Jian-Kou Shen entitled, "Control Store Addressing from Multiple Sources," filed on Dec. 19, 1988, Ser. No. 07/286,578, which is assigned to the same assignee as this patent application.
2. The patent application of Richard P. Kelly, Jian-Kou Shen, Robert V. Ledoux, and Chester M. Nibby, Jr., entitled, "Control Store Double Pump Operation," filed on Dec. 19, 1988, Ser. No. 07/286,581 now U.S. pat. No. 4,916,601, which is assigned to the same assignee as this patent application.
3. The patent application of Richard P. Kelly, and Robert V. Ledoux entitled, "Control Store Address Generator for Developing Unique Instruction Execution Starting Address," filed on Dec. 19, 1988, Ser. No. 07/286,582now abandoned, assigned to the same assignee as this patent application.
4. The patent application of David E. Cushing, Romeo Kharileh, Jian-Kou Shen and Ming-Tzer Miu entitled, "A Dual Port Read/Write Register, File Memory," filed on Dec. 19, 1988, Ser. No. 07/286,552 now U.S. Pat. No. 4,933,909, which is assigned to the same assignee as this patent application.
5. The patent application of David E. Cushing, Richard P. Kelly and Jian-Kou Shen entitled, "A Mechanism for Automatically Updating Multiple Unit Register File Memories," filed on Dec. 19, 1988, Ser. No. 07/286,551 now U.S. Pat. No. 4,980,819, which is assigned to the same assignee as this patent application.
6. The patent application of Thomas F. Joyce and Ming-Tzer Miu entitled, "Production Line Method and Apparatus for High Performance Instruction Execution" filed on Dec. 19, 1988, Ser. No. 07/286,580, now abandoned which is assigned to the same assignee as this patent application.

BACKGROUND OF THE INVENTION

1. Field of the Invention

This invention relates generally to data processing systems and more particularly to ring protection of information.

2. Description of the Prior Art

Computer software includes an operating system, utilities, language programs and application programs. The programmer writes the application program in a higher level language using a particular language program. The operating system software interfaces with the hardware to execute the instructions thereby compiling the application program in machine language. The operator interfaces with the compiled application to perform a particular job.

In order to safeguard the software stored in the system from accidental or deliberate modification, a ring protection arrangement was devised. Ring protection consists of a set of hierarchical levels of protection and may be visualized as a set of N concentric circles in memory numbered 0, 1, 2, ... N-1, from the inside out. The memory space included in circle 0 is called ring 0, the memory space included between circles 1 and 2 is called ring 2. Every segment of a process is placed in one ring of memory. The closer the segment is to the center, the greater its protection and privilege. Four rings numbered 0, 1, 2, and 3 are supported by the system. Ring 0 is the most privileged, ring 3 the least privileged.

A portion of the operating system typically resides in ring 0. The process scheduling of a memory management unit typically resides in ring 1. Software requiring high integrity typically resides in ring 2. User applications reside in ring 3.

A user is given a classification by the operating system. This classification gives the user access to processes in specific rings. Assume the user is given access to ring 2. Then that user cannot read processes in rings 0 and 1, but may read processes in rings 2 and 3.

A virtual memory consists of a collection of objects; each object has a name (in the form of a path name), a summary description (for example, length, a list of users allowed to use the object with their respective access rights) and a body.

To facilitate object management, objects are classified into two types: directory objects (containing descriptions of non-directory objects); and non-directory objects (containing the programs and data of the system). Whenever a request is made to reference an object, the Operating System (OS) uses the object's path name to promptly search the directory objects for the directory entry of the requested object. The directory entry is then used by the OS to determine if the object is accessible to the requesting user, and, if so, where the object is located, its size, and so forth.

Prior art systems with a virtual memory capability provided complex ring reduction logic as a part of a Virtual Memory Management Unit. U.S. Pat. No. 3,916,385 entitled, "Ring Checking Hardware" and U.S. Pat. No. 4,177,510 entitled "Protection of Data in an Information Multiprocessing System by Implementing a Concept of Rings to Represent the Different Levels of Privileges Among Processes" describe ring protection mechanisms. However present day computers have greater throughput requirements.

In a multi-stage production line system it is necessary to collect and process information regarding the protection of data whenever it is referenced. Protection provided by the operating system is enforced by localized hardware in different stages of the production line.

Accordingly, it is an object of the invention to provide a ring protection system having greater throughput in a stage of the production line.

SUMMARY OF THE INVENTION

The foregoing object of the instant invention is achieved by the following. A process type register is previously set to generate a secure process signal indicating a secure operation. During the execution of an instruction by an execution unit, the instruction is stored in an instruction register, the operand including its ring number is stored in a data register and the ring number developed by the Virtual Memory Management Unit is stored in a ring effective register. The instruction addresses a control store which stores a firmware microinstruction in a control store register. A firmware field is decoded to generate a plurality of ring control signals. The ring numbers from the data and ring effective registers are compared and an effective ring number is generated. Depending on the states of the secure process signal, the ring control signals and the relative value of the ring numbers, the effective ring number is binary 00 or the larger ring number.

BRIEF DESCRIPTION OF THE DRAWINGS

The novel features which are characteristic of the invention are set forth with particularity in the appended claims. The invention itself, however both as to organization and operation together with further objects and advantages thereof may best be understood by references to the following description taken in conjunction with the drawings in which:

DESCRIPTION OF THE PREFERRED EMBODIMENT

Figure 1:
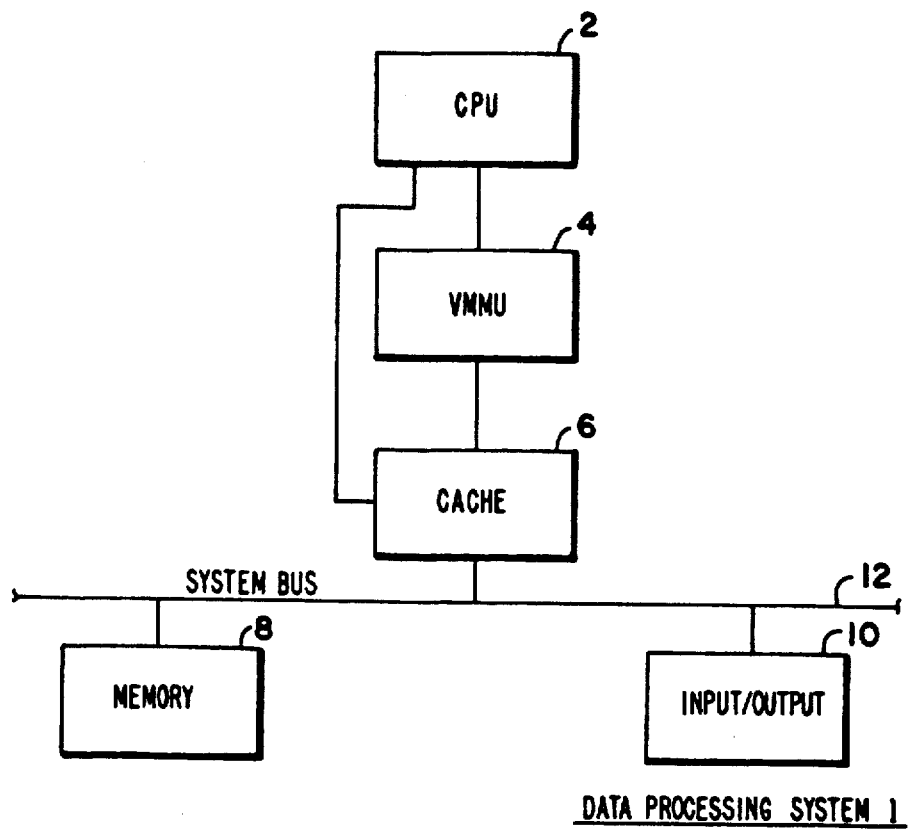
FIG. 1 is a block diagram of a computer system utilizing the invention.

FIG. 1 shows a block diagram of a production pipeline data processing system 1. Included are a central processing unit (CPU) 2, a virtual memory management unit (VMMU) 4, a cache unit 6, a memory subsystem 8, and input/output peripheral unit 10. The cache unit 6, memory unit 8, and input/output peripheral unit 10 are all coupled in common to a system bus 12. The memory 8 stores instructions and operands. Those instructions and operands having the highest probability of being executed immediately, are transferred to cache unit 6 from the memory subsystem 8.

The CPU 2 receives instructions from the cache unit 6 and in the execution of these instructions sends the virtual address portion of the instruction to VMMU 4. The VMMU 4 translates the virtual address into a physical address which are applied to cache unit 6 for fetching the necessary operands to allow the CPU 2 to execute the instructions. The VMMU 4 also applies a ring number to the CPU 2 which is used in the final ring number calculation.

The input/output unit 10 represents typically any number of peripheral controllers with their devices, or an input/output processor which controls peripheral controllers and devices, or the unit 10 may represent a communications subsystem.

Figure 2:
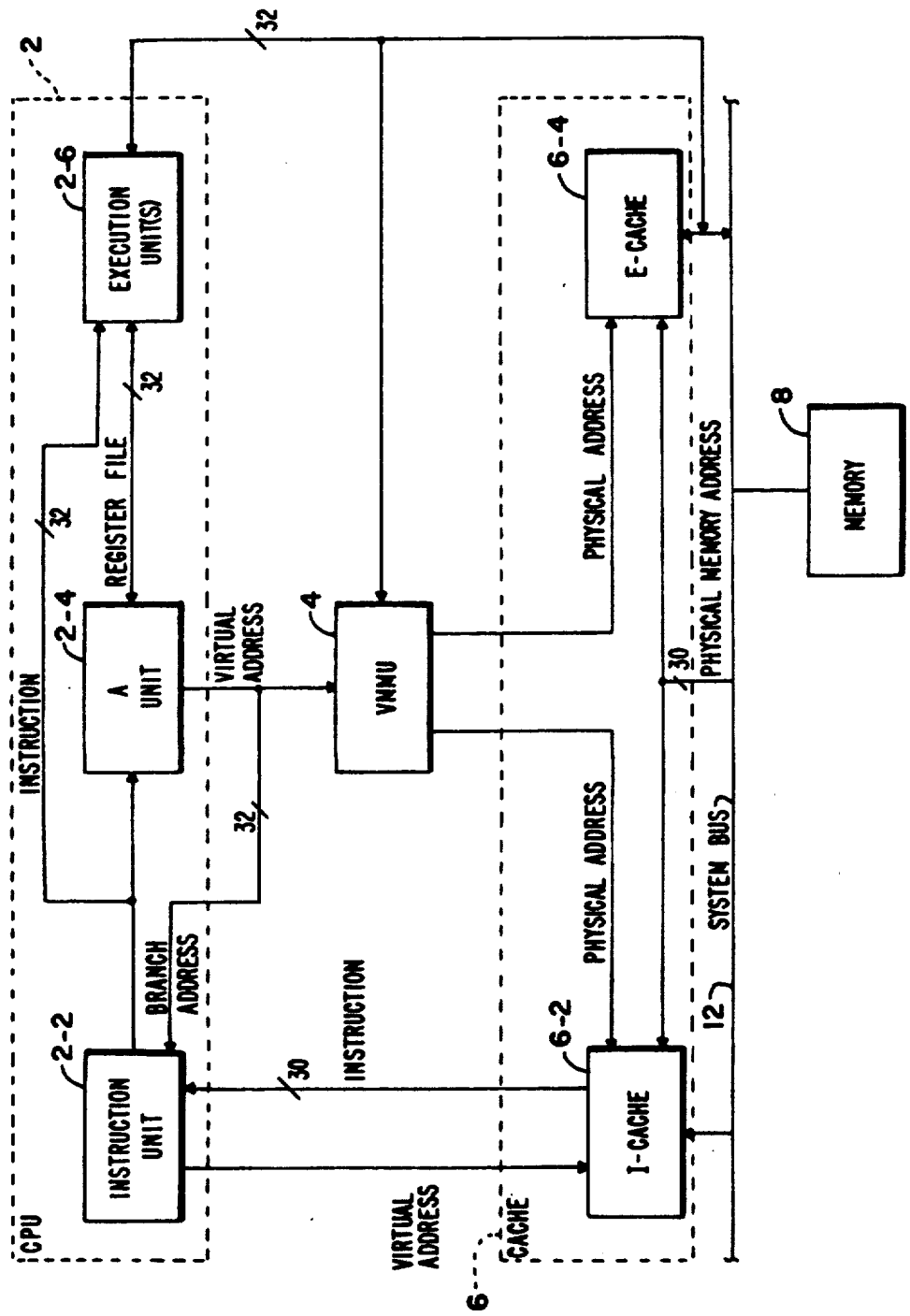
FIG. 2 is a block diagram of a central processor unit that incorporates the invention with its cache memories.

FIG. 2 shows in block diagram form the major elements that make up the CPU 2 and the cache unit 6. The CPU 2 includes an instruction (I) unit 2-2, an A unit 2-4, and a number of execution (E) units 2-6. The execution units 2-6 could be a scientific instruction processor or a commercial instruction processor. However, for simplicity of description, only the operation of one of the execution units 2-6 is described which is sufficient to understand the invention. The I unit 2-2, the A unit 2-4, and the E unit 2-6 are each incorporated in their respective semiconductor chips.

The cache unit 6 includes an I-cache 6-2 and an E-cache 6-4. The I-cache 6-2 stores the instructions that are to be executed and the E-cache 6-4 stores the operands upon which the instructions operate. The I-unit 2-2 performs essentially two functions. It prefetches instructions from I-cache 6-2 and then cracks those instructions to determine how the other units, namely the A unit 2-4 and the E unit 2-6, will further process the instruction. In addition the I-unit 2-2 executes certain branch instructions which are then removed from the production line.

The A unit 2-4 receives the instruction from the I-unit 2-2 and executes the instruction if it is a register-to-register instruction. When the instruction is to be executed by the E unit 2-6, the A unit 2-4 sends a virtual address which includes a ring number to the VMMU 4 which translates it into a physical address for the E-cache unit 6-4. E-cache 6-4 sends the operands to the E unit 2-6 for the completion of the execution of the instruction originally received by the instruction unit 2-2 from the I-cache unit 6-2.

The A unit 2-4 will also confirm the execution of a branch instruction and send the branch address back to the instruction unit 2-2 which has already requested the next instruction at the location in I-cache 6-2 specified by the I unit 2-2 pre-fetch branch address. Both the A unit 2-4 and the E unit 2-6 include register files which store the contents of the registers which are accessible to the programmers, that is, so called software visible registers. Each register file updates the other.

Both the I-cache 6-2 and the E-cache 6-4 are coupled to system bus 12 and their contents are updated with instructions and operands received from memory 8.

Instructions are executed in a production pipeline fashion by the elements of CPU 2. That is, the I unit 2-2 receives an instruction from I-cache 6-2, cracks it, and then sends the instruction to the A unit 2-4 and to the E unit 2-6 if it will execute the instruction. The A unit 2-4 either executes the instruction or sends the virtual address to the VMMU 4 for translation in order to address the E-cache 6-4. E-cache 6-4 sends the designated operands to the E unit 2-6.

While the A unit 2-4 is executing its portion of the first instruction from the I unit 2-2, the I unit 2-2 is fetching the second instruction and subsequent instructions from I-cache 6-2. When the A unit 2-4 sends the virtual address specified by the first instruction to the VMMU 4 and notifies the I unit 2-2 of that event, the I unit 2-2 sends, the second instruction to the A unit 2-4. The VMMU 4 addresses the E-cache 6-4 while the A unit 2-4 is processing the second instruction in the pipeline. When the E unit 2-6 is executing the first instruction, the VMMU 4 may be addressing E-cache to fetch the operands of the second instruction while the A unit 2-4 is generating a virtual address of the third instruction. Meanwhile, the I unit 2-2 is cracking the fourth instruction and fetching one of the subsequent instructions. Therefore, in this typical example, there could be five instructions progressing down the production line.

However, since the I unit 2-2 can execute certain branch instructions, and the A unit 2-4 can execute certain software visible register instructions, they are removed from the production line as soon as the execution of those instructions is completed. Similarly, when the A unit 2-4 is processing a branch instruction and the conditions of the branch are met, the A unit 2-4 immediately confirms the branch address of the I unit 2-2 and that branch instruction will be removed from the production line.

Figure 3A:
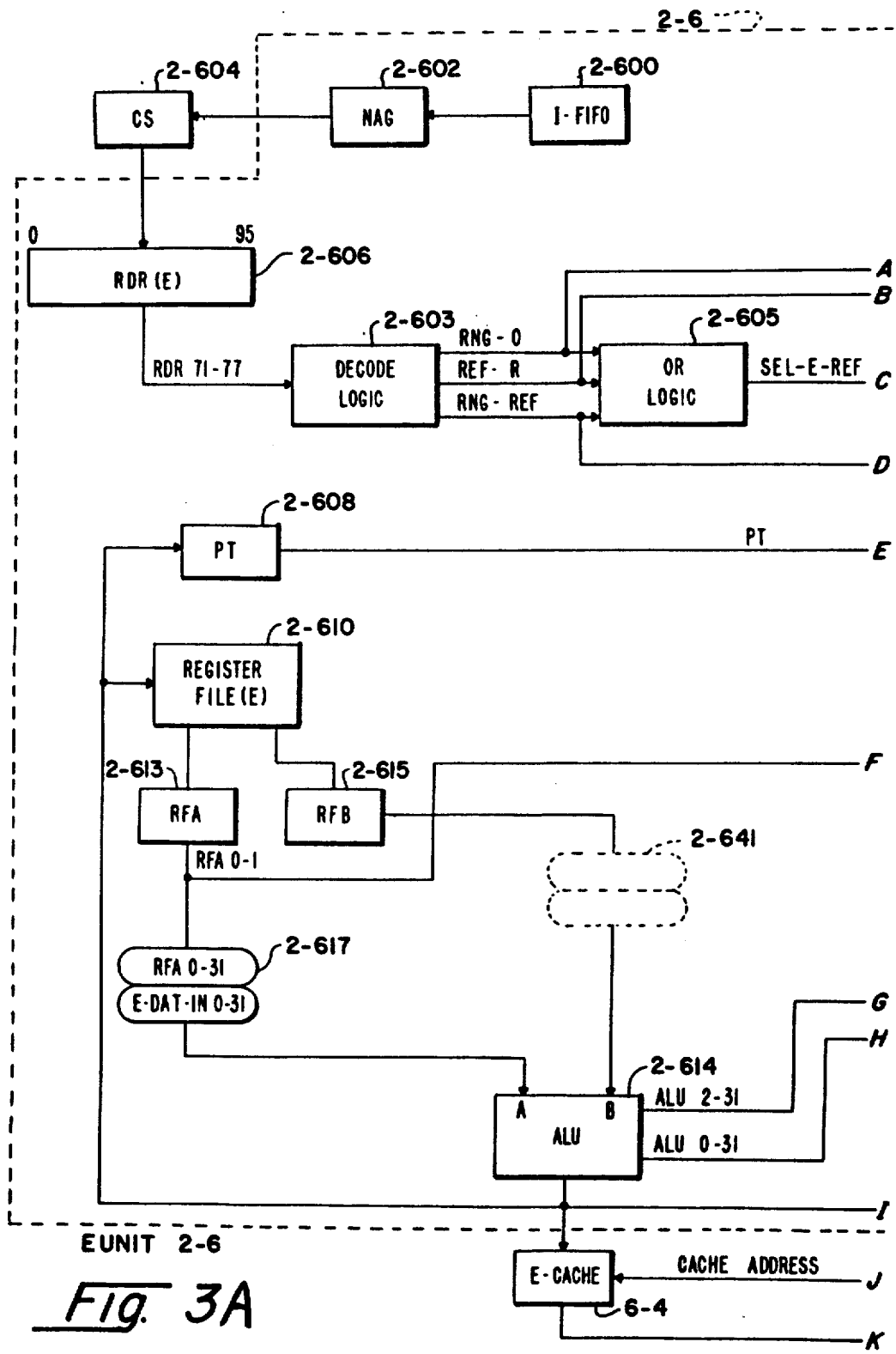
FIGS. 3A and 3B are a logic diagram of an execution unit of the central processor unit that shows the invention.
Figure 3B:
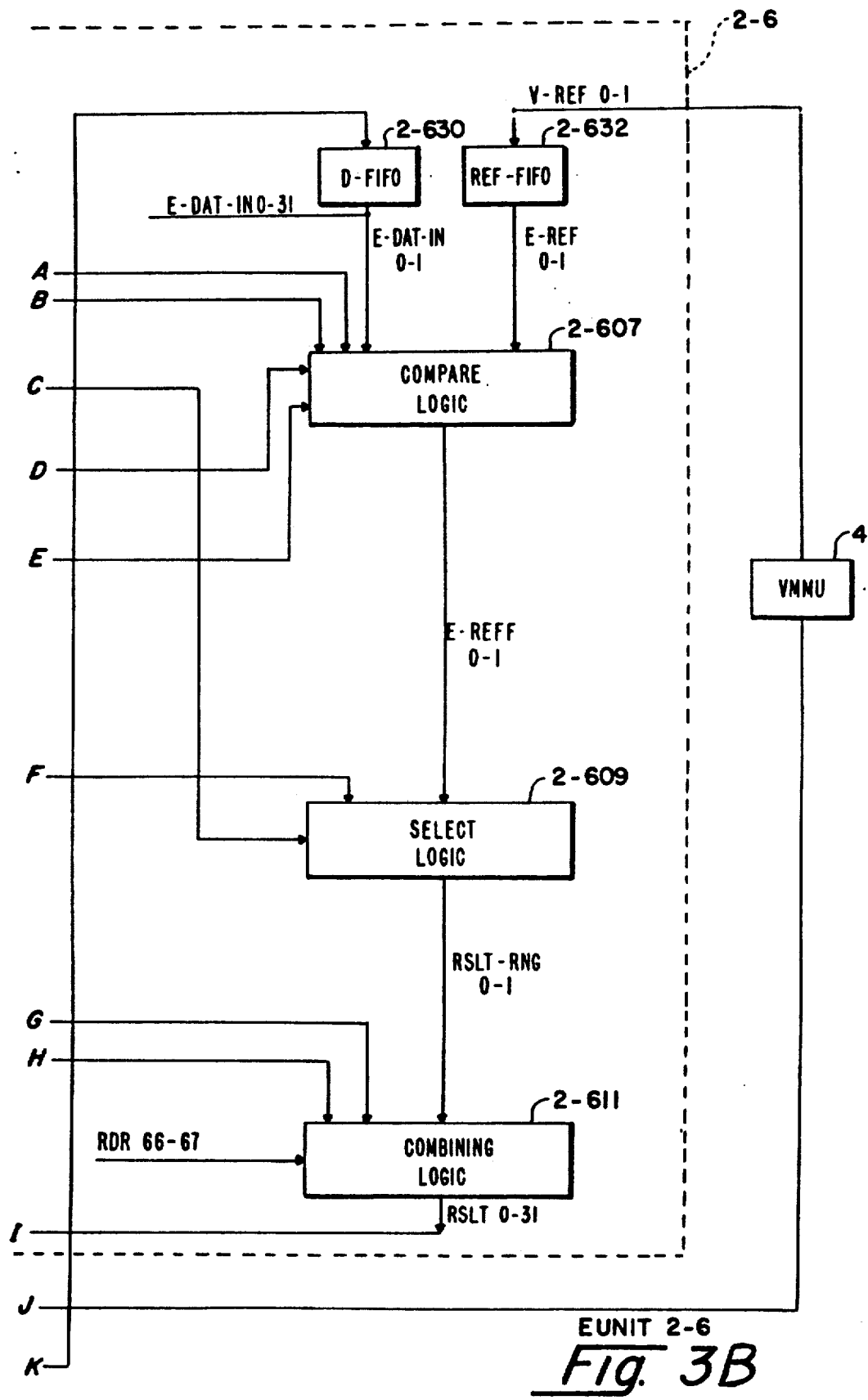

FIG. 3 shows the logic portion of the E unit 2-6 which describes the invention The E unit 2-6 stores an instruction received from the I unit 2-2 in an I-FIFO 2-600 for execution. A next address generator (NAG) 2-602 applies an address of a firmware microinstruction to a control store 2-604 which stores the firmware word in an RDR(E) (Ring Decode Register - Execute Unit) register 2-606. The firmware word RDR 0-95 controls the E unit 2-6 instruction execution. As an example an instruction may load a bit in a PT (Page Table) register 2-608 indicating a secure process operation. An arithmetic logic unit 2-614 may perform logic operations on operands received from D-FIFO 2-630 and register file(E) 2-610 via register RFA (Register File A) 2-613 and a multiplexer (MUX) 2-617, and register RFB (Register File B) 2-615. Operands from a number of sources not (shown) may be applied to the B input of ALU 2-614.

During the execution of an instruction, the VMMU 4 stores the ring number V-REF(0,1) in the REF-FIFO 2-632 and addresses the E-CACHE 6-4. The contents of the addressed location is stored in the D-FIFO 2-630.

The ring numbers E-DAT-IN(0,1) from D-FIFO 2-630 and E-REF(0,1) from REF-FIFO 2-632 are compared in compare logic 2-607 to generate signal E-REFF(0,1) which is applied to select logic 2-609. Depending upon the state of signal SEL-E-REF, either ring signals RFA(0,1) from register RFA 2-613 or E-REFF(0,1) are selected to generate ring signal RSLT-RNG(0,1).

Combining logic 2-611, depending upon the state of firmware signals RDR 66-67, combines the output signals ALU 2-31 from arithmetic logic unit 2-614 with ring signals RSLT-RNG(0,1) or selects signals ALU 0-31 to generate signals RSLT 0-31. Signals RSLT 0-31 may be stored in E cache 6-4 or in a software visible register in register file(E) 2-610 and a corresponding software visible register in register file(A) 2-404.

Following is the detailed logic which should be read with the Effective Ring Logic expressions that follow. Firmware microinstruction bits RDR 71-77 are applied to decode logic 2-603 to generate signals RNG-0, REF-R or RNG-REF. Signals RNG-0, REF-R or RNG-REF are applied to compare logic 2-607. Signal RNG-0 at logical ONE forces output signals E-REFF(0,1) to binary 00. Signal REF-R at logical ONE forces E-REFF(0,1) equal to E-REF(0,1). If signals RNG-REF and PT are both at logical ONE then E-REFF(0,1) equals E-REF(0,1) if E-REF(0,1) is greater or equal to E-DAT-IN(0,1); and E-REFF(0,1) equals E-DAT-IN(0,1) if E-DAT-IN(0,1) is greater than E-REF(0,1).

Signals RNG-0, REF-R or RNG-REF are applied OR logic 2-605 to generate signal SEL-E-REF at logical ONE to specify a ring reduction operation thereby selecting E-REFF(0,1) from select logic 2-609. Otherwise select logic 2-609 selects RFA(0,1).

The RNG-0 signal is active when performing address arithmetic on virtual addresses. In that case, the ring field of the operand is forced to binary 00 before the arithmetic operation is performed (E-REFF(0,1)=1).

The REF-R signal is active during indirect addressing. E-REFF(0,1) is the largest of E-REF(0,1), R1, or RN.

The RNG-REF signal is active during the execution of an instruction which uses a virtual address as an operand. E-REFF(0,1) is the larger of E-REF(0,1) or E-DAT-IN(0,1).

Figure 4:
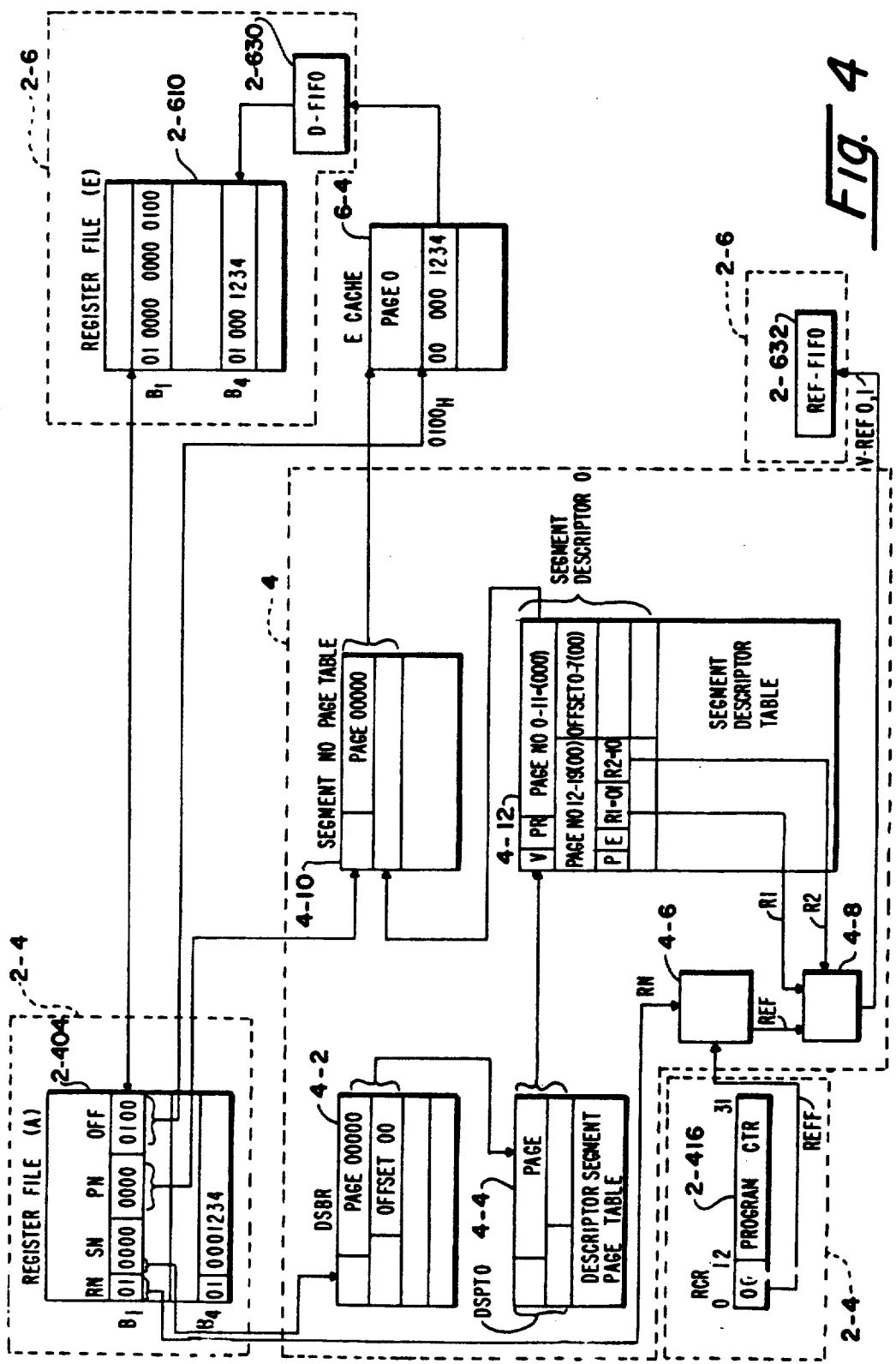
FIG. 4 is a software block diagram of the portion of the Virtual Memory Management Unit which translates virtual addresses to physical addresses and includes the ring development logic.

Referring to FIG. 4, assume a read operation, an LDB $B1 B4 instruction which loads software visible register B4 of register file (A) 2-404 with the contents of the E cache 6-4 location pointed to by the virtual address stored in software visible register B1. Also assume the following:

The ring number of the current process RCR, signal REFF, is 00. The two bit RCR was previously stored in the program counter 2-416.

The virtual address stored in B4 includes a ring field RN having a value equal to 01, a segment number field (SN) having a value equal to hexadecimal 0000, a page number field having a value equal to hexadecimal 0000 and an offset of hexadecimal 0100.

The virtual address allows a process to address any object in the virtual memory. The segment number (SN) addresses a specific object or part of an object of less than or equal to one million words. Each segment contains 1024 pages and each page contains 1024 words. The page number PN addresses a page in the segment. The offset specifies a word stored in a page. The ring number specifies the access rights of the virtual address. The two high order bits of SN point to a Descriptor Segment Base Register (DSBR) 4-2. The DSBR 4-2 includes a page number, hexadecimal 00000, and an offset, hexadecimal 00, which points to the location of Descriptor Segment Page Table 0 (DSPT 0) 4-4. The page number field, hexadecimal 00000, of DSPT 0 4-4 points to Segment Descriptor 0 of a Segment Descriptor Table (SDT) 4-12. SD 0 specifies the access rights assigned to the process by the operating system.

A V bit indicates a valid SD 0. A PR bit indicates that the execution of instructions is allowed only if in ring 0. A P bit indicates a paged segment. An E bit indicates that instruction fetches from this segment are permitted only if the processor is executing in a ring greater than or equal to R1 and less than or equal to R2. R1 specifies the highest (least privileged) ring number of the read/write bracket for this segment. In the example R1=01. R2 specifies the highest ring number of the read/execute bracket for this segment. In the example R2=10. The page number field, hexadecimal 00000, specifies the location of a Segment Number Page Table (SNPT) 4-10. The PN field of register B1 points to the location within the SNPT 4-10 which stores the page number of the operand. The offset, hexadecimal 0100, of register B1 points to the location of the operand in E cache 6-4. The physical address is made up of the offset from B1 and the page number from the SNPT 4-10.

The effective ring REF, the output of logic 4-6, is the larger of REFF and RN. REFF equals 00 and RN equals 01, therefore REF equals 01. The ring number R2 in SD 0 of segment descriptor table 4-12 is 10 and since REF is less than R2, it has greater access rights and permits the data to be read. While reading the operand, REFF is computed to determine which ring number is to be loaded into the base register of the LD $B1 B4 instruction. Signals V-REF 0,1 are generated in logic 4-8 by the larger of R1 and REF which is stored in the REF FIFO 2-632. In this case both have a value equal to 01.

The contents of location 0100, which includes ring number 00 is stored in DATA FIFO 2-630. The logic therefore selects ring number 01 from the REF FIFO 2-632 for storage in software visible register B4.

In summary, the operations that are potentially permitted to a process in ring R on a segment whose ring brackets are r1, r2, r3 are:
Write: if $0 <= R <= r1$
Read: if $0 <= R <= r2$
Execute: if $r1 <= R <= r2$

| Call: | if $r2 < R <= r3$ (inward call, execution in r3) |
|---|---|
| | if $r1 <= R <= r2$ (lateral call, execution in R) |

The Call operation is described in U.S. Pat. No. 4,703,417, entitled "Call Instruction For Ring Crossing Architecture".

EFFECTIVE RING LOGIC

Decode logic 2-603 (FIG. 3)
  RDR 71-77 equals hexadecimal 01, then signal RNG-0=1
  RDR 71-77 equals hexadecimal 02, then signal REF-R=1
  RDR 71-77 equals hexadecimal 04, then signal RNG-REF=1
OR logic 2-605
  RNG-0+REF-R+RNG-REF=SEL-E-REF
Compare logic 2-607
  If RNG-0=0, then E-REFF(0,1)=00
  IF REF-R=1, then E-REF(0,1)=E-REFF(0,1)
Translate Addressing Mode (TAM)
  If RNG-REF & PT & (E-REF(0,1) > =E-DAT-IN(0,1)), then E-REFF=E-REF
  If RNG-REF & PT & (E-REF(0,1) < E-DAT-IN(0,1)), then E-REFF=E-DAT-IN(0,1)
Absolute Addressing Mode (AAM)
  IF RNG-REF & PT, then E-REFF(0,1)=00
Select logic 2-609
  RSLT-RNG(0,1)=RFA(0,1) if SEL-E-REF=0
  RSLT-RNG(0,1)=E-REFF(0,1) if SEL-E-REF=1
Combining logic 2-611
  RSLT(0-31)=RSLT-RNG(0,1):ALU(2-31) if RDR 66-67=01

When in the AAM, the processor interprets all virtual addresses as physical addresses, that is, no address translation is performed. All virtual addresses have their ring numbers set to zero. When in the TAM, the processor translates all virtual addresses to physical addresses using segment and page tables.

Having shown and described a preferred embodiment of the invention, those skilled in the art will realize that many variations and modifications can be made to produce the described invention and still be within the spirit and scope of the claimed invention.

What is claimed is:

1. A ring reduction execution unit for generating a ring number of a ring reduction process during the execution of a pipeline instruction, said ring reduction execution unit comprising:
   (a) process type register means for generating a secure process signal specifying a ring reduction operation;
   (b) memory means for storing a first operand having a first ring number portion and a first data portion;
   (c) ring effective register means for storing a second ring number generated by a virtual memory management unit;
   (d) instruction register means for storing said pipeline instruction;
   (e) control store means coupled to said instruction register means and responsive to said pipeline instruction for generating a plurality of firmware microinstructions for executing said pipeline instruction;
   (f) decode logic means responsive to a first plurality of said firmware microinstructions for generating a plurality of ring control signals; and,
   (g) compare logic means, coupled to said ring effective register means, said memory means, said process type register means, and said decode logic means, for concurrently responsive to said first ring number, said second ring number, said secure process signal and said plurality of ring control signals in order to generate an effective ring number, and said ring control signals being operative to force said effective ring number to a predetermined value for selected types of said pipeline instruction.

2. The ring reduction execution unit of claim 1 wherein said ring reduction execution unit further comprises:
   register file means for storing a second operand having a third ring number portion and a second data portion;
   OR logic means coupled to said decode logic means and responsive to one of said plurality of ring control signals for generating a select signal in a first state;
   select logic means coupled to said OR logic means, said compare logic means and said register file means and responsive to said select signal in said first state for selecting said effective ring number, and responsive to said select signal in a second state for selecting said third ring number portion, said select logic means thereby generating a fourth ring number.

3. The ring reduction execution unit of claim 2 further comprising:
   arithmetic logic means for performing arithmetic and logical operations on said first and said second data portions, or said first or said second data portions and generating a third operand having a third data portion;
   combining logic means coupled to said control store means, said select logic means, and said arithmetic and responsive to a second plurality of firmware microinstructions for appending said fourth ring number to said third data portion.

4. The ring reduction execution unit of claim 1 wherein said effective ring number is binary 00 when a first ring control signal is in a second state.

5. The ring reduction execution unit of claim 1 wherein said effective ring number is equal to said second ring number if a second ring control signal is in a first state.

6. The ring reduction execution unit of claim 1 wherein said effective ring number is equal to said second ring number if a third ring control signal is in a first state, said secure process signal is in a first state and said second ring number is greater than or equal to said first ring number portion.

7. The ring reduction execution unit of claim 1 wherein said effective ring number is equal to said first ring number portion if a third ring control signal is in a first state, said secure process signal is in a first state and said second ring number is less than said first ring number portion.

8. The ring reduction execution unit of claim 1 wherein said effective ring number is equal to binary 00 if a third ring control signal is in a first state and said privilege signal is in a second state.

* * * * *